Figure 1:
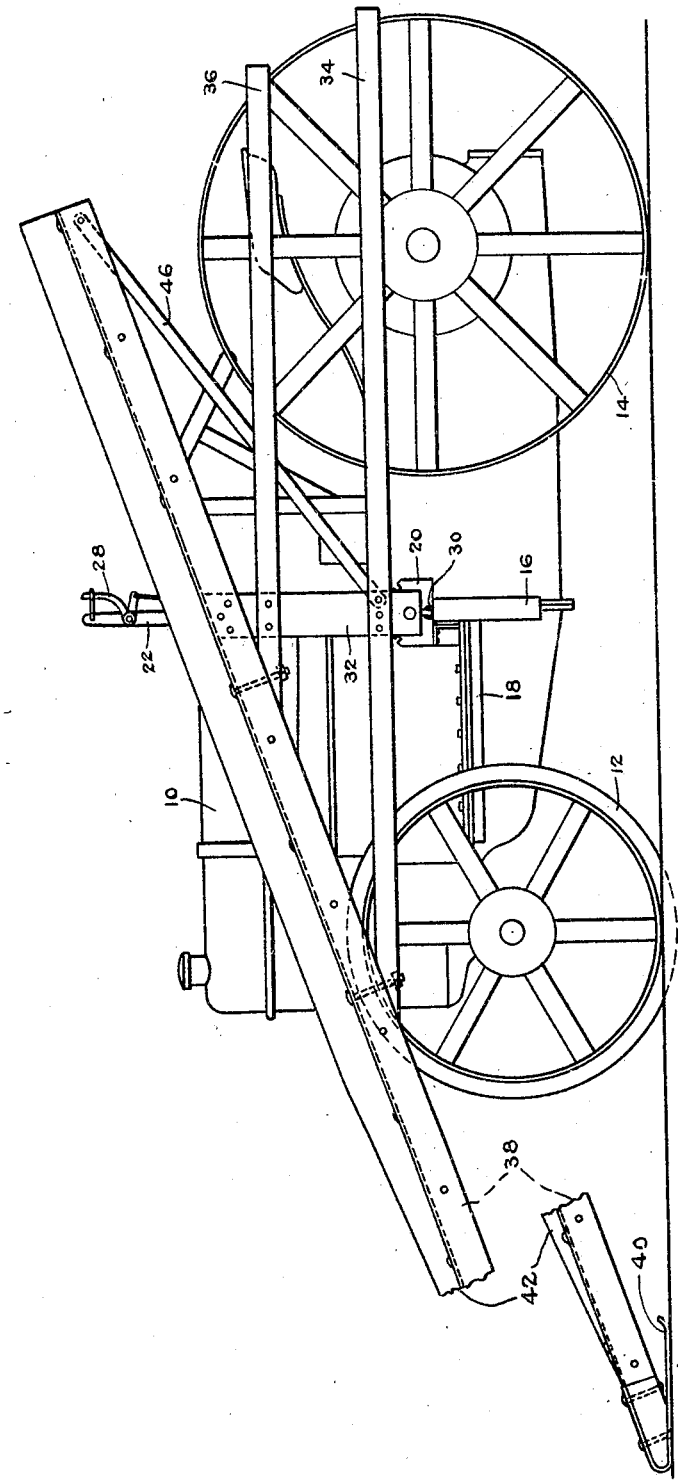

Oct. 23, 1928.　　　　　　　　　　　　　　1,689,046
R. W. OLSON
STALK LIFTING ATTACHMENT FOR TRACTORS
Filed July 14, 1926　　　3 Sheets-Sheet 1

Inventor
R. W. Olson.
By Whiteley
and
Ruckman
Attorneys.

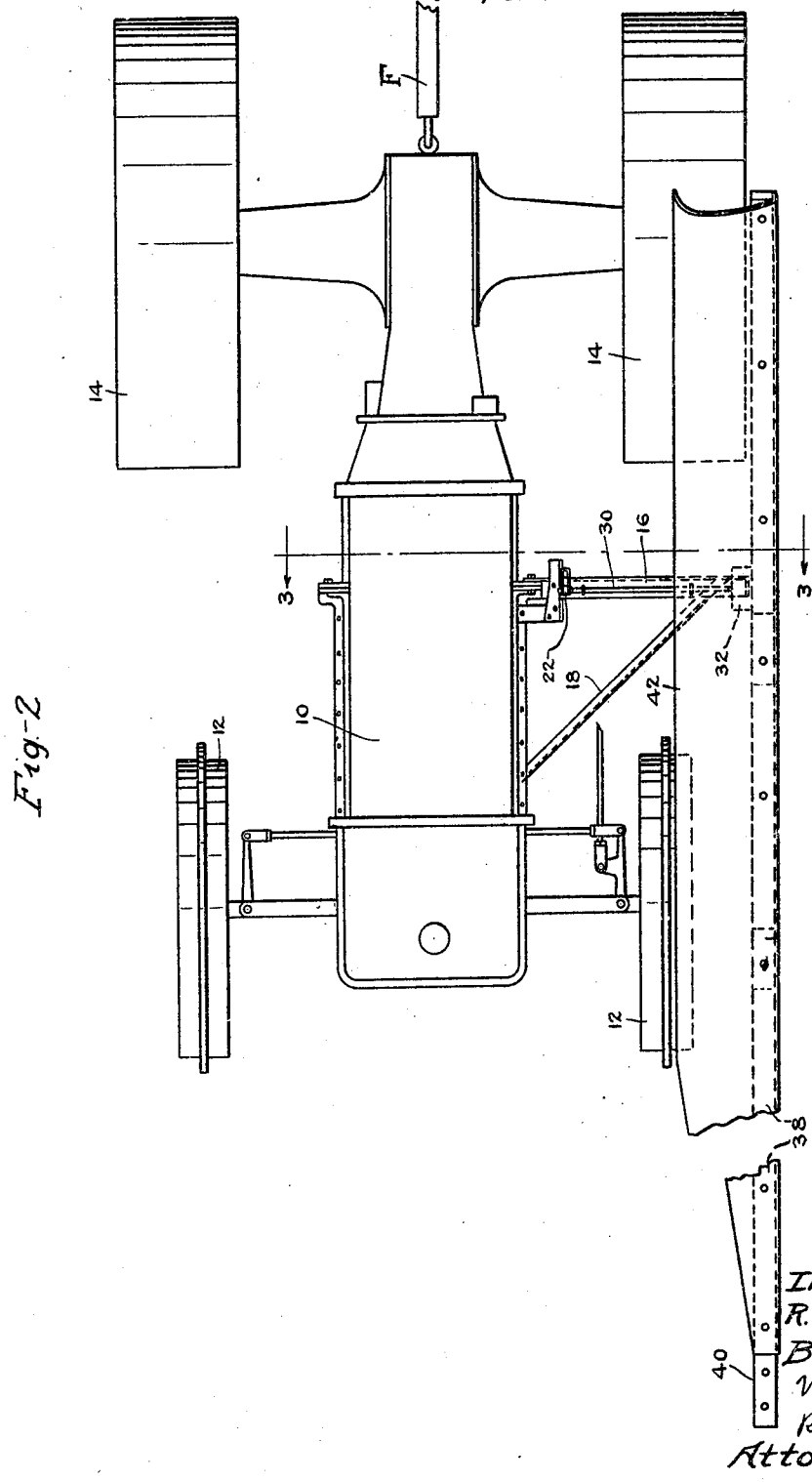

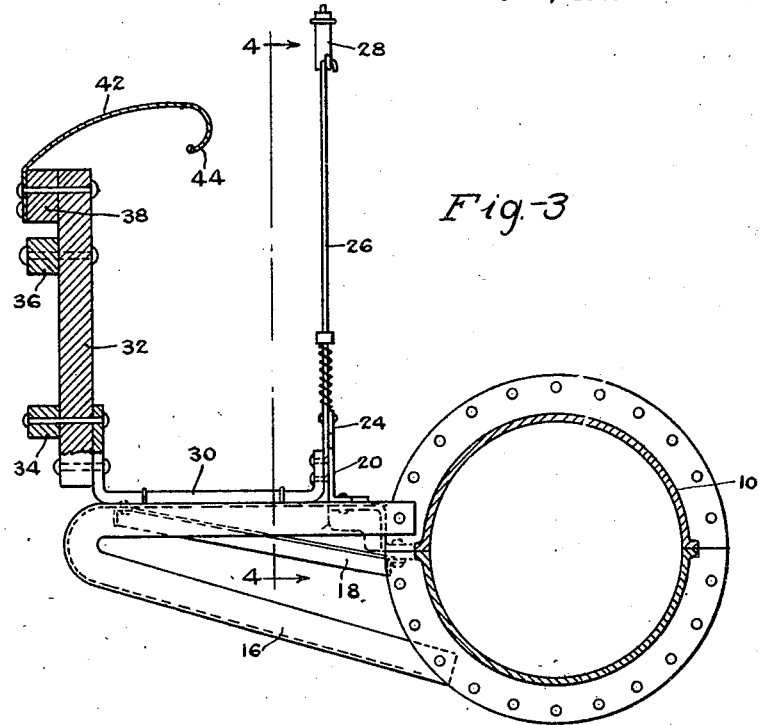

Patented Oct. 23, 1928.

1,689,046

UNITED STATES PATENT OFFICE.

ROBERT W. OLSON, OF AMBOY, MINNESOTA, ASSIGNOR OF ONE-HALF TO WILLARD M. BOLLENBACH, OF LAMBERTON, MINNESOTA.

STALK-LIFTING ATTACHMENT FOR TRACTORS.

Application filed July 14, 1926. Serial No. 122,388.

My invention relates to stalk-lifting attachments for tractors, and an object is to lift the corn stalks or other stalks which lie in the path of a tractor which is used to pull a picker or harvester. Heretofore, it has been customary to run the tractor out of alinement with the picker or harvester by means of a laterally deflected drawbar in order that the tractor shall not run over down stalks in the row which is being picked or harvested. By the use of my attachment, the down stalks in said row are lifted in advance of the tractor, thus enabling the wheels of the tractor and of the picker or harvester to travel in alinement and with a straight pull of the drawbar. In this way, the tractor may be hitched closer to the machine which is being pulled, thereby putting weight on the rear tractor wheels which increases their traction. The elimination of side draft increases the efficiency of the drawbar and permits the tractor to be easily turned in either direction. Also since the operator is seated directly in front of the machine, he is enabled to watch the operation thereof much better.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is a side elevational view showing the device attached to a tractor and with a portion of the pick-up frame broken off for convenience of illustration. Fig. 2 is a top plan view. Fig. 3 is a view in vertical section on the line 3—3 of Fig. 2. Fig. 4 is a view in vertical section on the line 4—4 of Fig. 3. Fig. 5 is a diagrammatic view showing a tractor in the position which it occupies when used for pulling a picking or harvesting machine.

Referring to the construction illustrated in the drawings, the numeral 10 designates in general a tractor having two front wheels 12 and two rear wheels 14. A bracket 16 is secured to the tractor so as to extend out laterally therefrom between the front and rear wheels at one side, the device as shown being attached to the left side of the tractor. The bracket 16 may be made of angle iron, and its outer end is connected by an inclined brace 18 of angle iron to the tractor. A notched segment 20 is secured to the upper side of the bracket 16 and a handle member 22 carries a spring-pressed dog 24 connected by a rod 26 with a bell crank lever 28 mounted on the upper end of the handle member. The lower end of the handle member is secured to the inner upturned end of a rod 30 rotatably mounted on the upper side of the bracket 16. The outer upturned end of the rod 30 is secured firmly to a vertical bar 32 which constitutes part of a pickup frame. Horizontal bars 34 and 36 are secured intermediate their ends to the vertical bar 32 while a downwardly inclined bar 38 is secured to the upper end of the bar 32 and to the forward ends of the bars 34 and 36. The forward and lower end of the bar 38 is provided with an angular piece of metal 40 to constitute a nose for engagement with the ground. Secured to the inclined bar 38 is a curved sheet metal strip 42, the inner edge 44 of which is turned back as shown in Fig. 3 so that it will not pull off the ears of the corn stalks as the latter are gradually lifted into upright position. The member 42 constitutes a guide for the stalks. As shown in Fig. 1, the metal strip 42 extends above the front wheel 12 while the horizontal bars 34 and 36 extend slightly past the rear wheel 14. The stalks are, therefore, positively prevented from getting into or being run over by the wheels of the tractor. A brace bar 46 connects the rear end of the inclined bar 38 with the lower end of the vertical bar 32.

The operation and advantages of my invention will be obvious in connection with the foregoing description, especially in connection with Fig. 5 in which the lines A, B, C, D, and E represent successive rows of corn, it being understood that C, D, and E represent rows which have been picked or cut and that B represents a row which is being picked or cut. The tractor 10 is connected by a drawbar F to the machine M which may be considered as representing either a picker or harvester which is operating upon the row B. Any stalks in this row which lean toward the tractor will be lifted into upright position by the inclined member 42 so that the wheels of the tractor will pass underneath instead of running over such stalks. The pickup frame carrying the member 42 is lifted by the handle member 22 when the machine reaches the end of the row and is then lowered into place when the machine is scraping around into the new row.

I claim:

1. A stalk lifting attachment for tractors employed for pulling harvesters for crops grown in rows comprising a bracket arranged for fastening directly to the tractor, a pickup frame mounted on said bracket and extending past the rear of the tractor, and an inclined guide for stalks carried by said frame in such manner that its forward end is positioned adjacent the ground in advance of one of the front wheels of the tractor and its other end extends above the corresponding rear wheel of the tractor.

2. A stalk-lifting attachment for tractors employed for pulling harvesters for crops grown in rows comprising a bracket arranged for fastening directly to the tractor, a pick-up frame mounted on said bracket and extending along one side of the tractor, and an inclined guide for stalks carried by said frame in such manner that its forward end is positioned adjacent the ground in advance of the tractor and its other end occupies an elevated position at the rear of the tractor.

In testimony whereof I hereunto affix my signature.

ROBERT W. OLSON.